July 15, 1924.
C. L. KELLER
CAR UNLOADER
Original Filed Jan. 19, 1920   5 Sheets-Sheet 1
1,501,879
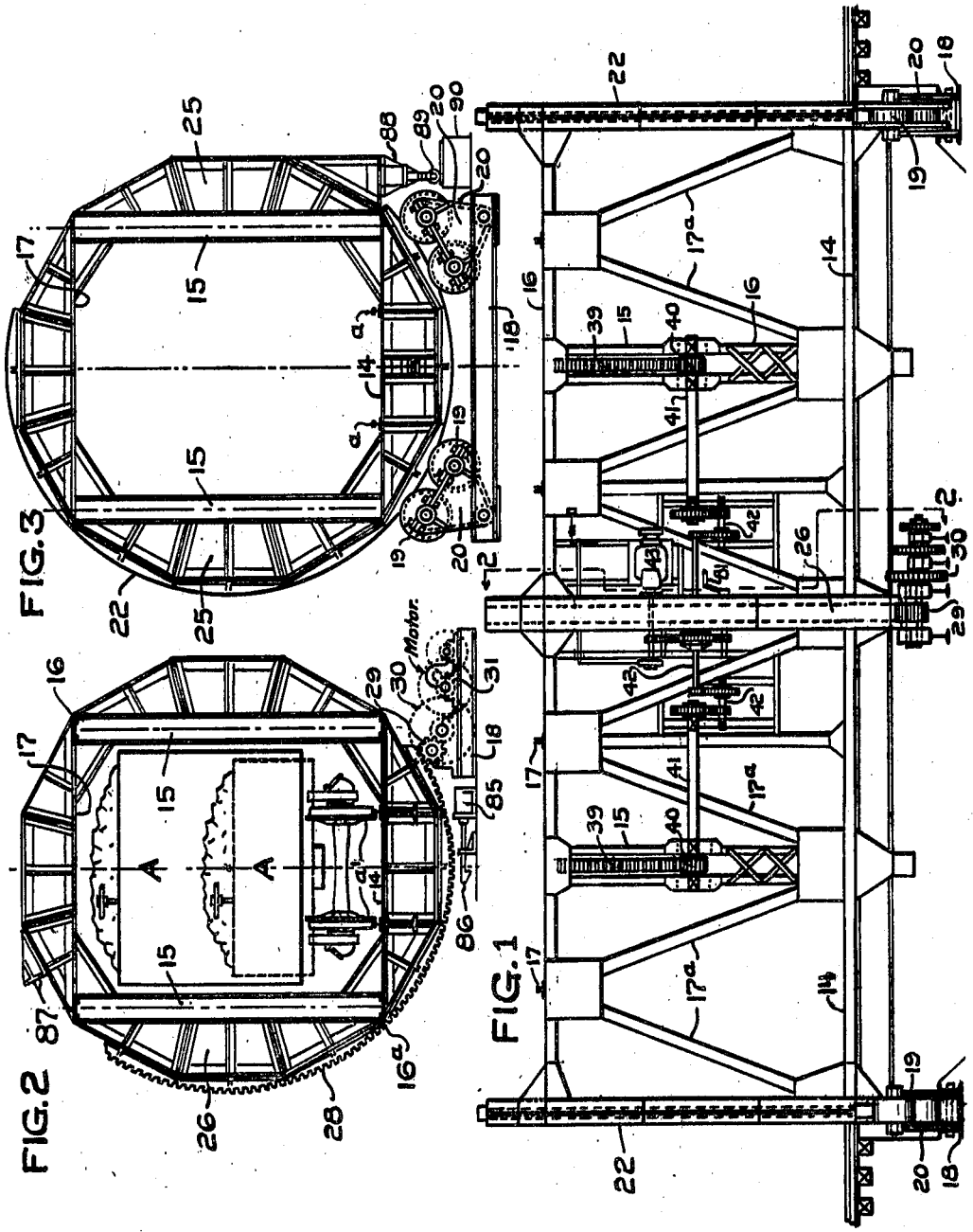
INVENTOR.
Charles L. Keller
BY
ATTORNEY

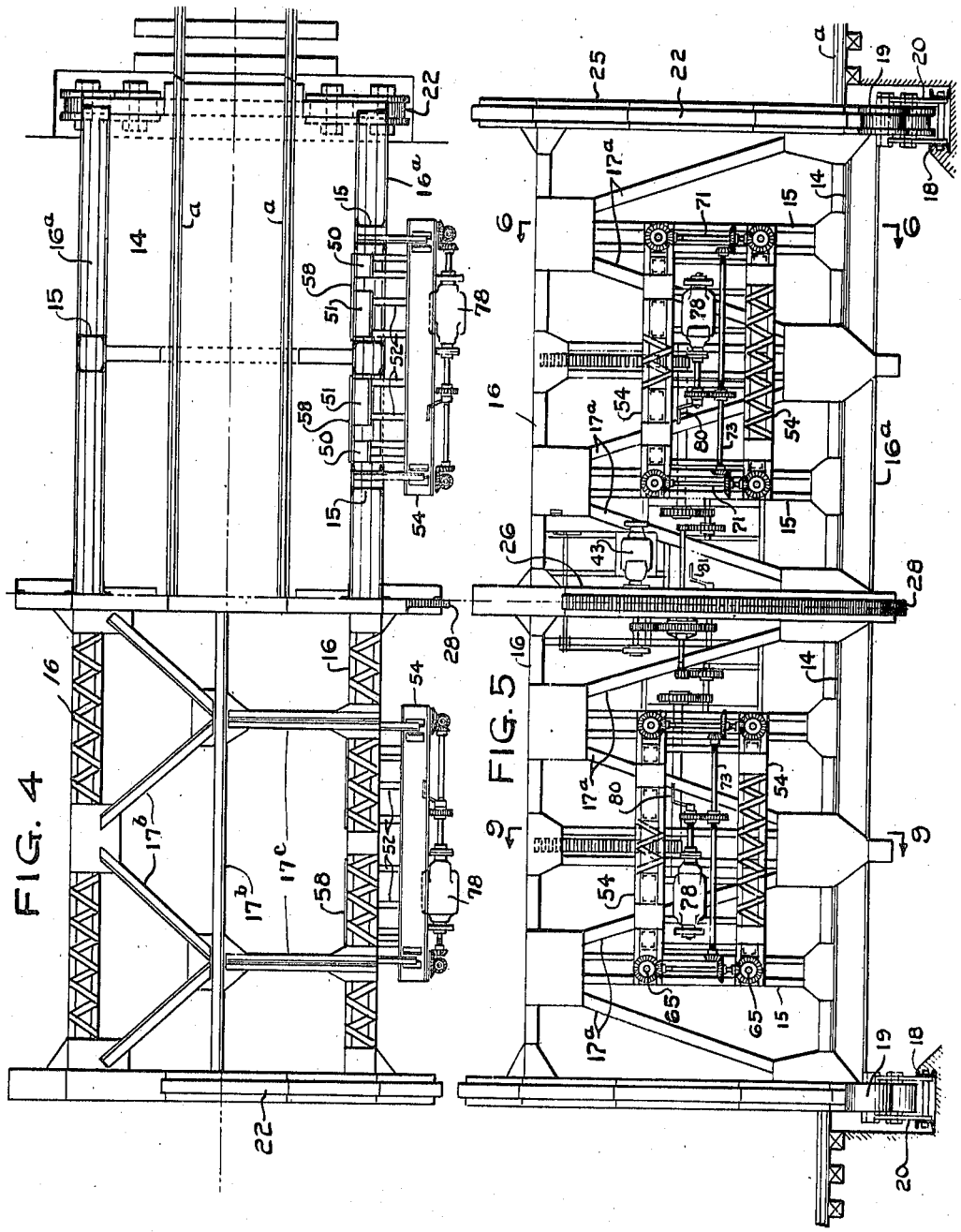

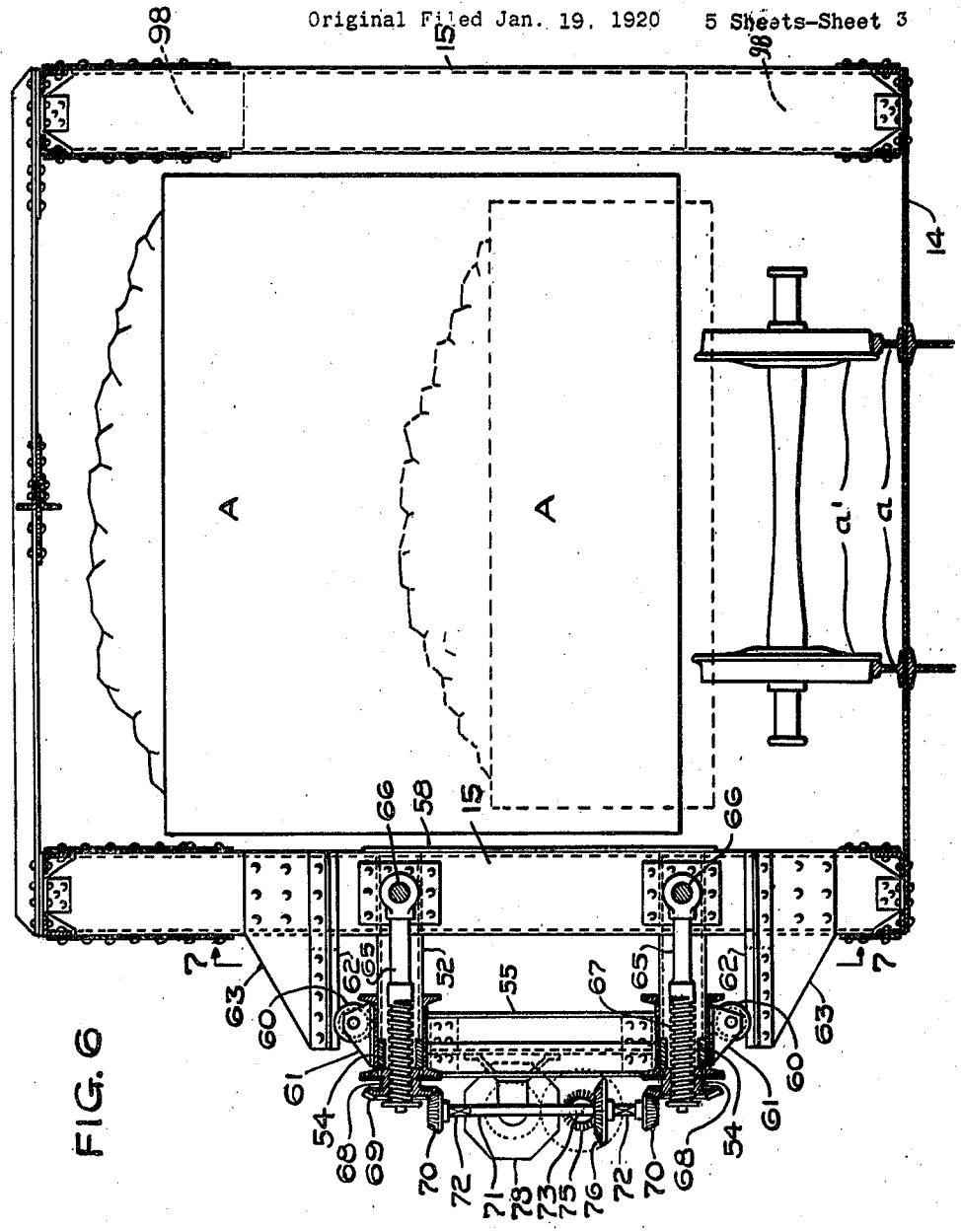

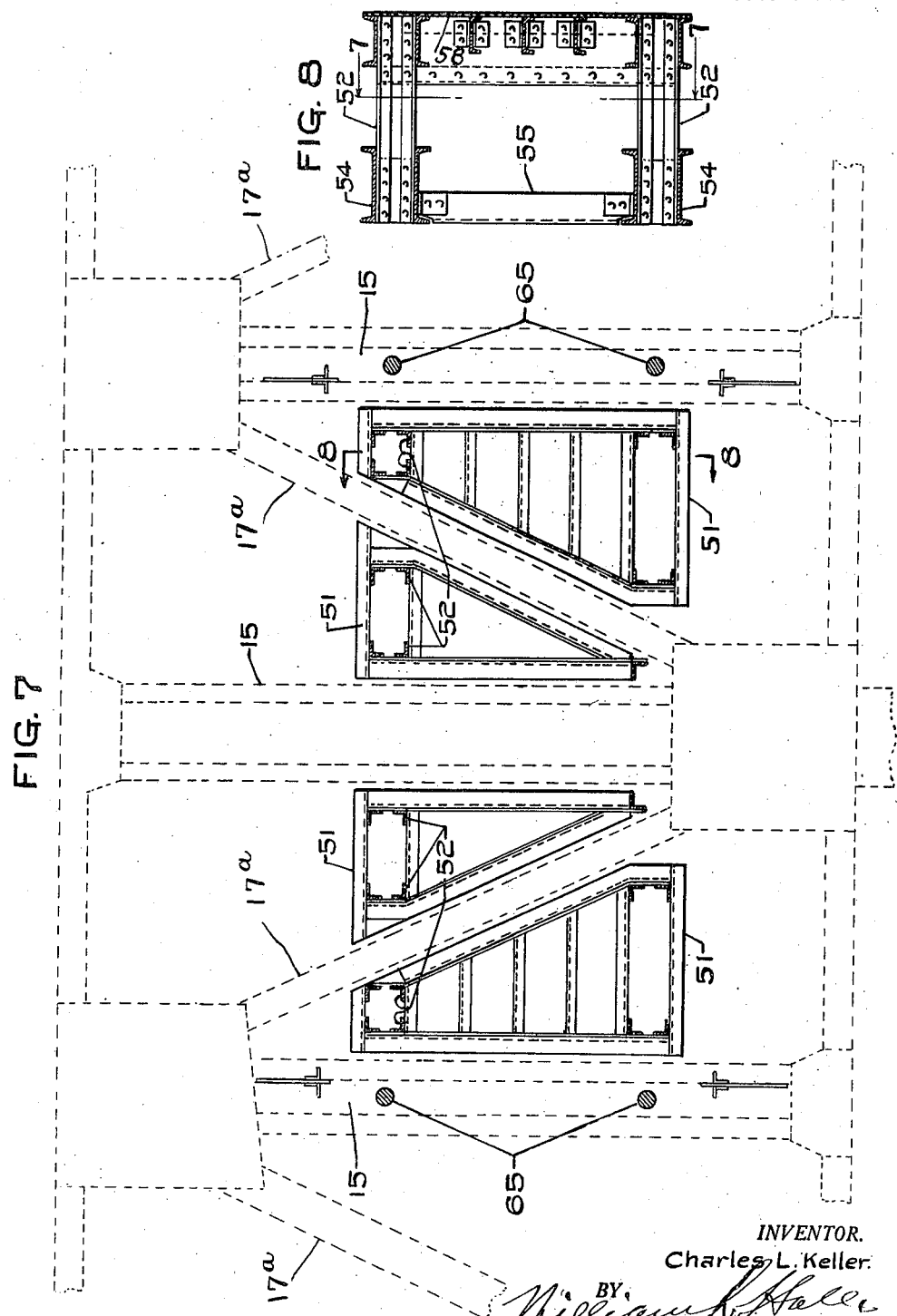

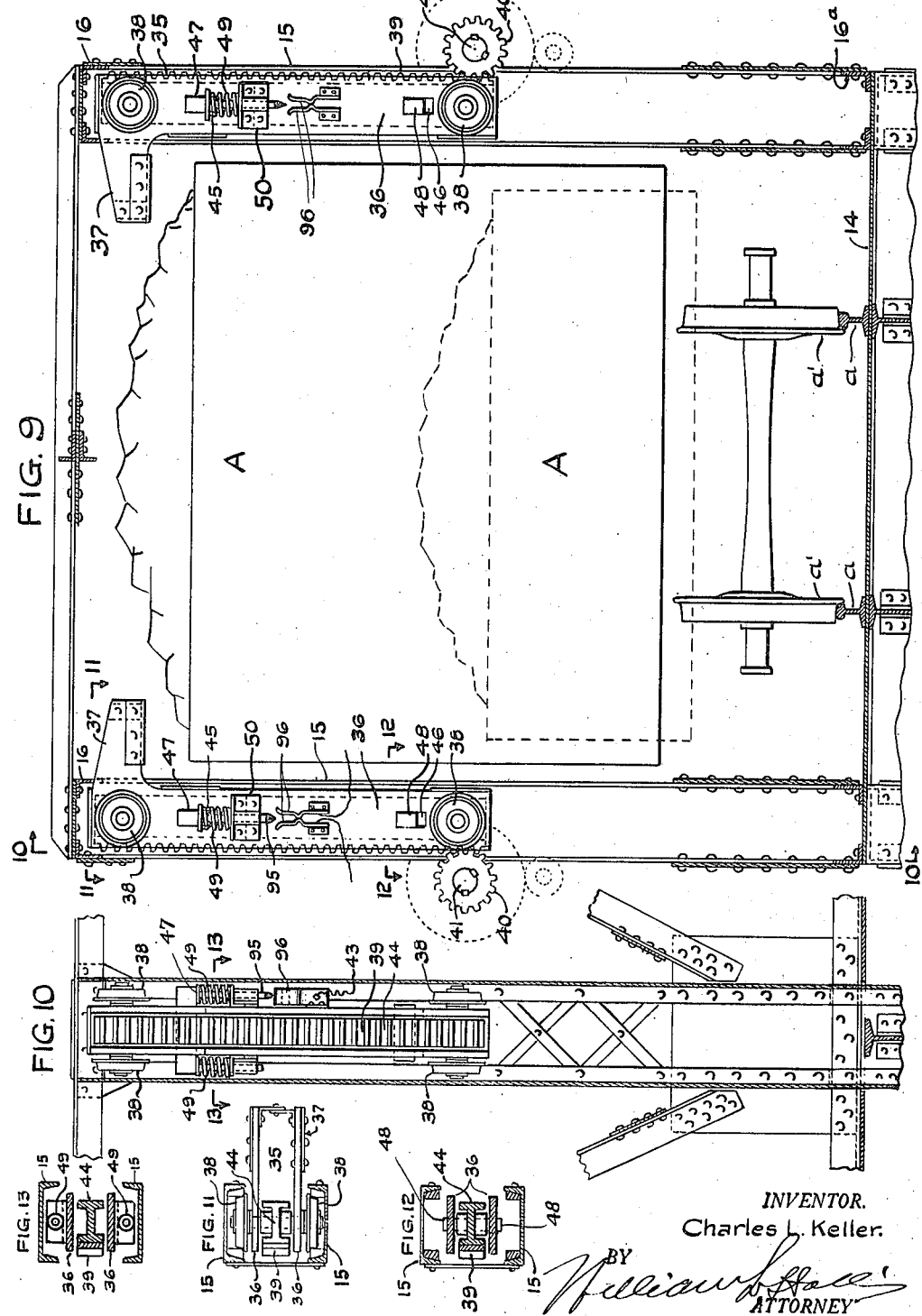

Patented July 15, 1924.

1,501,879

UNITED STATES PATENT OFFICE.

CHARLES L. KELLER, OF CHICAGO, ILLINOIS, ASSIGNOR TO THE SCHERZER ROLLING LIFT BRIDGE CO., OF CHICAGO, ILLINOIS, A CORPORATION OF ILLINOIS.

CAR UNLOADER.

Application filed January 19, 1920, Serial No. 352,290. Renewed May 23, 1924.

*To all whom it may concern:*

Be it known that I, CHARLES L. KELLER, a citizen of the United States, and a resident of Chicago, in the county of Cook and State of Illinois, have invented certain new and useful Improvements in Car Unloaders; and I do hereby declare that the following is a full, clear, and exact description thereof, reference being had to the accompanying drawings, and to the characters of reference marked thereon, which form a part of this specification.

This invention relates to improvements in car unloading devices of that character which embraces a rocking frame having a track on which the cars are run, with means to lock and support the car in the frame, so that when the frame is rocked the car is turned in position to dump its contents.

Among the objects of the invention is to provide novel means for locking and holding the car in the frame or cage, embracing down-holding means to prevent the car moving away from its track, and embracing also side-holding and supporting means in the nature of a platform to support the car while being dumped, and so constructed that the side holding means are supported on the frame exterior to the car space and adapted to extend and be movable through said frame, thereby utilizing the car space in the frame to a maximum extent and lessening the width of the frame as a whole, the diameter of its supporting bearers and the weight of the entire device and the track space required for an equipment.

A further object of the invention is to provide a novel support for the car in the nature of a platform on which the car is directly supported on its side when the frame and car are in dumping position, and operating mechanism therefor, with means for operating the platform to adjust it to the car when the car is in normal position and for supporting the car when in dumping position, the platform being located and supported within the truss of the frame and constructed with extensions through the truss to support the car when the latter is approaching toward, receding from, and is in its dumping position.

A further object of the invention is to provide limiting and centering stops on the rocking frame and its fixed support constructed to align the rails on the frame with the outside rails and to also provide means to limit the movement of the rocking frame so as to bring the frame and its load gently to rest at both limits of movements of the car dumper frame, pneumatic bumpers being preferably provided.

Another object of the invention is to apply rocking power to the dumping frame in a manner to equalize the turning power at both ends of the frame and thereby avoiding torsional stress on the frame due to dumping movement thereof.

A further object of the invention is to produce a construction so arranged that when a loaded car is run into the unloader, the center of gravity of the entire mass will be above the turning axis of the cage or frame of the unloader, so that the weight of the load assists to dump the car and brings the center of gravity of the resultant mass below said turning axis so as to assist in returning the loader to its normal position. Thereby the power required to operate the loader may be reduced and the load of the car becomes the active factor to balance the operative stresses of the operating mechanism.

A further object of the invention is to provide a novel bearing roller means to support the frame or cage, so constructed as to be free to adjust and equalize its weight on said rollers to balance the loaded car on the unloading frame.

Another object of the invention is to so flange the rocking unloader frame relatively to the supporting wheels or rollers that the frame is free to longitudinally expand without imposing objectional stress on the parts or to cause them to bind and consume unnecessary operating power.

A further object of the invention is to counterbalance the rocking frame or cage in its normal position.

Other objects of the invention are to improve the general construction of the unloading frame and the means for applying power thereto and for controlling the movement of the frame and a car therein, and to improve the means for mounting the unloading frame for dumping movement, and the invention consists in the com ation and arrangement of the parts shown in the drawings and described in the specification, and is pointed out in the appended claims.

In the drawings, showing one embodiment of my invention.

Figure 1 is a side elevation of a car unloader embodying the invention, showing the operating mechanism for the top holders.

Figure 2 is a vertical section thereof on the line 2—2 of Figure 1.

Figure 3 is an end elevation of the unloader.

Figure 4 is a plan view of the frame on two elevations or levels.

Figure 5 is a side view of the rocking frame, showing the side holder mechanism with parts omitted.

Figure 6 is an enlarged vertical section on the line 6—6 of Figure 5.

Figure 7 is an enlarged detail of the bearers of one of the side holders, showing the cooperating parts of the frame in dotted lines, on line 7—7 of Figure 6.

Figure 8 is a vertical section on the line 8—8 of Figure 7.

Figure 9 is an enlarged vertical section on the line 9—9 of Figure 5.

Figure 10 is a vertical section on the line 10—10 of Figure 9.

Figures 11 and 12 are transverse sections on the lines 11—11 and 12—12, respectively, of Figure 9.

Figure 13 is a transverse section on line 13—13 of Figure 10.

The car supporting rocking frame or cage embraces a floor 14, on which are laid the track rails $a$ to support the wheels $a'$ of the car A to be unloaded; vertical standards 15, 15, upper and lower latticed girders 16, 16$^a$, and transverse top connecting members 17, 17$^b$, the latter suitably fabricated to permit the car contents to be dumped therethrough. The horizontal girders 16, 16$^a$ are connected by the web members 17$^a$ to stiffen the side truss members of the frame. The horizontal members 16, 16$^a$, together with the upright members 15 and 17$^a$ constitute truss formations at each side of the dumping frame, in which the members 16, 16$^a$ constitute the top and bottom chords, respectively, and the members 15, 17$^a$ the web members, when the dumping frame is in its normal car receiving position, with the two trusses thus formed connected by top bracings 17, 17$^b$, 17$^c$ to connect the trusses.

The frame is sustained on any suitable fixed support, indicated at 18, through the medium of bearing rollers 19, 19, whose supporting frames 20 are pivotally sustained on the support 18 (Figure 3). The said roll supporting frames are triangular, as shown, and each is pivoted to the support 18 at one angle, with the rollers spaced from each other and rotatively mounted at the other angles of said supporting frames. Said frames are inclined inwardly toward each other and are loosely connected to the pivots that connect them to the fixed support 18, so that said supporting rollers and their frames adapt themselves to the unloader frame as cradle equalizing supports on which the frame rests and by which the weight of the frame on said supports is equalized, both when at rest and when turning.

The said rocking dumping frame is formed to provide at both ends curved tread members 22 that rest and travel on said rollers 19, said tread members embracing considerably more than one half of a circle. Said tread members are sectional and are attached to fabricated trussed girder structures 25 (Figure 3) composed of suitably fabricated members that are rigidly attached to the truss frame to stiffen the same as well as to form bearers for said frame.

The dumping frame embraces, additionally, a driving ring member 26 (Figures 2 and 5) located between the ends of the frame and constructed essentially like the ring members 25. There is formed on or attached to said intermediate member 26 a segmental toothed gear or rack 28 that is concentric with the turning axis of the unloading frame. Said segmental rack 28 meshes with a pinion 29 that is driven, through suitable reducing gears 30 (Figures 1 and 2), by a motor 31 (Figure 2), preferably an electric motor.

The car A, which may be of any of the variable dimensions indicated in Figures 2, 6, and 9, is adapted to be locked in the rocking frame by means which prevent the car wheels from leaving the tracks $a$, and also hold the car from lateral movement in the frame during the dumping operation. In designing the rocking dumping frame, its rocking axis can be located in a horizontal plane which approximates the average center of gravity of the larger and smaller cars. That is to say, in the smaller cars, the rocking axis of said frame can be in a plane slightly above the center of gravity of the mass of the frame, the car and its load, and in the larger cars, the rocking axis of said frame can be slightly below the plane of the center of gravity of the frame, the car and its load. When the unloader is adapted to one size of car, the disposition of the loading will be such as to bring the center of gravity above the rocking axis of the frame. Thus, the weight of the load assists the mechanism to rock the frame, when unloading, and when the load is dumped the center of gravity of the resultant mass will assist in restoring the frame and car to normal position.

It will be understood that the motor 31 may be associated with a suitable magnetic brake, so that when the center of gravity of the moving mass is above the plane of rotation of the frame, said brake will operate to neutralize the overthrow tendency of the load mass. This particular brake feature is common in devices of this general character and constitutes in itself no part of the present invention.

The car is prevented from leaving or moving from the tracks a (Figures 9, 10, and 11) by means of down-holding members, or top holders, designated as a whole by 35. Said down-holding members comprise parallel shank members 36 and hook members 37, the later adapted to overhang and engage the top of a car A. The said shank members 36 of the down-holding members are located between the members of the box-form standards 16, as most clearly shown in Figures 9, 10, 11, and 12, and are guided in vertical movement in the channel members of said standards by guide rollers 38, as best shown in Figures 9, 10, and 11. The said shank members 36 of the down-holding devices cooperate with and carry rack bars 39, which are adapted to mesh with pinions 40 on shafts 41 that are connected, through suitable reducing gears indicated as a whole by 42 at each side of the rocking frame, with a motor 43 Figure 1. Said motor 43 operates through the reducing gears 42 to raise or lower the down-holding devices 35, and the rack bars 39 on the shanks of said down-holding members are of sufficient length to adapt the down-holding members to cars of different heights.

In order to avoid jambing of the down-holding hooks 37 on the car, or prevent burning out of the motors 43, lost motion is provided between said hooks 37 and the pinions 40, which may be made as follows: The racks 39 are formed on bars 44 that lie between the twin shank members 36. The said bars 36 are provided with slots or openings 46, through which are adapted to extend lateral guide lugs 48 (Figures 9 and 12) carried by the bars 44. Buffer springs 49 of substantial strength are interposed between the upper lugs 47 fixed to the members 44 and extending through openings in the members 36 and brackets 50 fixed to the shanks 36 to permit yielding movement between the rack bar and hooks 37 at the instant of engagement between said hooks and the car. The range of action of the coils of the springs is such that the springs will be closed before the guide lugs 48 strike the bottoms of their slots or openings 46. In operation, the racks 39 move with the shanks of the down-holding devices until the hooks strike the car, whereupon the springs yield to cushion and stress on the operative parts. Means may be associated with the relatively movable rack bar to open the circuit of the motor 43, as will hereinafter be described, and thus cut off the down-holding device operating power.

Referring now to the supporting platform by means of which the cars are supported in the rocking frame during unloading movement thereof, said parts are made as follows:—

At the side of the rocking dumping frame towards which said frame rocks for dumping are located mobile platforms embracing the bearer members 51, 51, which are of such length and width as to sustain the weight of a car and its load in the frame when in dumping position, at which time the car is held or braced in the frame by the down holders 37. They are fixed to the inner ends of thrust members or plungers 52 (Figures 4 and 7) which latter are fixed at their outer ends to oblong rectangular operating machinery carrying frames comprising upper and lower beams 54 connected by vertical members 55. The said bearer members 51, 51 are shaped to pass between the connected web members 15, 17a of the truss side members of the dumping or unloading frame. Said bearer members are herein shown as of general triangular shape to adapt themselves to the truss members and each pair of bearer members is connected at their inner ends by bearing plates 58 that directly engage the sides of the car. The said platforms are supported, and guided, on the rocking dumping frame through the medium of bearing rollers 60 (Figure 6) that are rotatively mounted in lugs 61 that are fixed to the members 54, and said rollers are interposed between and bear against opposing tracks 62 which are fixed to brackets 63 that extend laterally from the standards 15 at one side of the rocking frame.

The rectangular side holder actuating frames, comprising the members 54, 55, to which are connected the outer ends of the thrust members or plungers 52 of the bearers 51, 51, are moved toward and away from a car in the rocking frame by means made as follows:

65, 65 designate screw shafts constituting anchor members, one located at each corner of each oblong rectangular side-holder actuating frame. They are formed at their inner ends to provide eyes that engage pins or studs 66 which are fixed to the standards 15 of the frame. The outer threaded ends 67 of said shafts 65 are threaded through nuts 68 that are swiveled to the side-holder operating frame in the manner indicated in Figure 6, whereby the nuts may freely turn about their axes, but are linearly immovable relatively to said frame in the direction of their axes. Said nuts are formed integral with or are attached to beveled gears 69, 69, which mesh with beveled pinions 70, 70 that are fixed to the upper and lower ends of upright shafts 71 that are rotatively mounted in suitable bearings 72 carried by said side holder operating frames. The shafts 71 at the ends of each frame are connected by a cross shaft 73 that is provided at its ends with beveled pinions 75 which mesh with beveled gears 76 that are fixed to said upright shafts 71. The cross shaft 73 of each side holder operating frame is connected by suitable reducing gears to a motor 78 (Figures 4 and 5) that is carried by said operating frame. The said motor 78 and the shafts and gears connected thereto operate to simultaneously drive all of the nuts 68 of each operating frame so as to move the platforms squarely towards and from the car to properly engage the car when downheld by the hooks 37, preparatory to the dumping operation; and the length of travel of the nuts on the shafts 65 is sufficient to adapt the platforms to cars of different widths. Preferably and as herein shown, each of said platform operating frames is provided with its own actuating motor so as to thereby enable the platforms to properly engage the side of a car which may not be exactly square in respect of the rocking frame. The supporting plates 58 of said platforms are such as to give firm support to a car when lying on its side, and the areas thereof, taken with the separate adjustments of the two or more platforms at the side of the car, enables said platforms to fit and properly engage for reliably holding cars whose side contours depart materially from a flat plane. Moreover, the extended areas of said platforms enables the supporting stresses to be distributed widely through the area of the car side and thus avoids local stresses which tend to crush the car walls.

Preferably and as herein shown, the shafts of the motors 78 are provided with hand cranks 80 whereby the platforms may be operated in the event of failure of current. Also the gearing which connects the motors 45 to the top holders may also be provided with hand cranks 81 for a like purpose.

In order to limit or control the total turning movement of the rocking dumping frame, suitable stop devices are employed, one operating at the limit of the dumping movement of the frame, and the other at the opposite limit of movement of said frame. The stop devices for limiting the movement of said frame towards its dumping position embraces an air cushion cylinder 85 (Figure 2) which is fixed to the support 18 in any suitable manner, and the stem of the piston of said cushioning cylinder is formed with a part 86 that is adapted to engage a shoulder 87 on the rocking frame.

The devices for limiting the movement of the frame in the opposite direction, and which also serves to align the rails *a* with the outside track rails comprises an air cushion cylinder 88 (Figure 3) that is carried by the frame, the piston stem 89 of which is adapted to engage a fixed abutment block 90 fixed to the supporting structure of said frame. One of these blocks is located at each end of the rocking frames.

In operation, the car to be unloaded is run into the rocking frame when occupying the position shown in Figures 1 and 2. Thereafter the motors 45 are operated, through the reducing gear mechanism described to draw downwardly the hooked ends 37 of the top holders into engagement with the top of the car. The travel of the shanks of the top holders in the standards 15 is such as to adapt said holders to cars of widely different heights, as clearly shown in Figure 9. After the top holders have thus been adjusted to the car the motors 78 are operated to rotate the nuts 68 and to thereby force the platforms against the side of the car. It will be understood that the said platforms are located at the side of the now locked in the rocking dumping frame moves in its dumping position. The car is now locked in the rocking dumping frame and is ready to be unloaded or dumped. The contents of the car is dumped through the operation of the motor 31 and its gearing 30 (Figure 2) which rotates the pinion 29 that is in mesh with the rack 28 of the frame. The dumping movement of the frame will be arrested by engagement of the shoulder 87 with the stop 86 of the air cushion stop device. After the contents of the car has been unloaded the dumping motor 31 may be reversed, or a reversing mechanism interposed between the motor and the pinion 29 may be operated, to restore the frame and car to normal position, the frame being arrested by engagement of the air cushion stop device 89, with the abutment 90, as shown in Figure 3.

When it is desired to utilize the yielding lost motion between the racks 39 and the hooks 37 to open the operating circuits of the motor 43, certain of the pins 95, which extend downwardly from the lugs 47 and slide through the brackets 49, and which hold the cushioning springs 49 in place may be shaped at their lower ends to spread apart normally engaged terminals 96 included in the motor circuit and thereby open said circuit. For this purpose the advance ends of the pins are tapered and may be made of or faced with insulating material.

It will be observed, by reference to Figures 4 and 6, that said platforms and the operating mechanisms are located within the circle of the supporting treads or segments of the curved, trussed girders 25 at the ends of the frame and that they extend and are movable through the trussed frame sides, so that thereby the entire structure is very compact and the lateral width of the dumping frame and the radius of the supporting curved girders are reduced to a minimum, thereby avoiding undue spreading of the tracks at the unloader.

The dumping frame is normally counterbalanced by the counterweight material 9b, as reinforced concrete, indicated in dotted lines in Figure 6, being of such mass and weight as to counterbalance the supporting platforms and their operating mechanisms.

It will be noted that said unloader frame is supported at its ends on the rollers 19 in a manner to be free to rock thereon when power is applied, and that power to rock said frame is applied at the longitudinal center thereof through the rack 28 and pinion 29. By thus driving or rocking the frame from its center and supporting it freely on the rollers 19 all tendency of twisting the structure of the frame is obviated such as would occur if the driving or rocking power be applied at both ends thereof or at points distant from the said center of the frame. In the latter arrangement there would be a tendency to apply rocking or driving power unequally at or near the ends of the frame, which would cause the frame structure to be twisted. This central driving or rocking function of the frame is well adapted to the equalizing function of the end supporting rollers 19 and their frames to maintain the rocking frame in position to be operated with driving power economy and stability of the dumping frame.

As a further improvement, the tread 22 at one end of the frame is interlocked with the adjacent rollers, either by flanging the rollers or treads (the rollers in the embodiment shown) while the tread and rollers at the other end of the frame have wide smooth engaging faces, as best shown in Figures 1 and 5. The construction permits endwise expansion of the frame without imposing objectional stress on the treads or rollers such as would tend to spread the parts out of proper rolling alignment. Moreover, such construction avoids a binding or wedging action between the rollers and treads such as would, if present, impose an unnecessary friction restraint to turning of the frame, with the result of increasing power necessary to rock the frame.

I claim as my invention:

1. A car unloader comprising a rocking car supporting frame having a side truss and a track, top down holders carried by the frame for holding a car on said track, a side car supporting platform exterior to the truss and having extensions movable through the truss and provided with bearers for contact with the car side and normally in the plane of the inner side of the truss, and means for separately operating said platforms to move said bearers toward and from a car side.

2. A car unloader comprising a rocking car supporting frame, top holders embracing toothed shanks having guiding means in the frame to guide them in vertical movement and provided with hooks to engage over the top of a car, pinions meshing with said toothed shanks, and a motor carried by said frame, with speed reducing gears between said motor and said pinions.

3. In a car unloader, a rocking car supporting frame provided with tracks to receive a car, a pair of top holders, one pair at each side of said frame having means for guiding them in vertical movement, a single motor on each side of the frame and speed reducing gears between each motor and the top holders on the associated side of the frame.

4. In a car unloader, a rocking supporting frame, top holders embracing toothed shanks having means to guide them in vertical movement in the frame and provided with hooks to engage over the top of a car, pinions meshing with said toothed shanks, motors carried by said frame, with speed reducing gears between said motor and said pinions, and manual means for operating said pinions and thereby actuating said top holders.

5. In a car unloader, a rocking car supporting frame having upright frame members, top holders comprising shanks and overhanging hooks, the latter to engage over the top of a car, and power means independent of the movement of the said frame to actuate said top holders, embracing resilient lost motion connections between the power means and said hooks.

6. In a car unloader, a rocking car supporting frame, top holders comprising shanks having guiding engagement for vertical movement with said frame and provided with hooks to engage over a car, and actuating means therefor independent of the movement of said frame having resilient lost motion relatively to said hooks.

7. In a car unloader, a rocking car supporting frame, top holders comprising shanks having guiding engagement for vertical movement with said frame and provided with hooks to engage over a car, toothed actuating members having spring connections to said hooks, pinions meshing with said toothed actuating members, and a motor to drive said pinions.

8. In a car unloader, a rocking car supporting frame having upright frame members, top holders comprising shanks and overhanging hooks, the latter to engage over the top of a car, electric motor driven means to actuate said top holders, embracing lost motion connections to said hooks, and motor circuit breaking means operative through said lost motion connections.

9. In a car unloader, a top holder comprising a two-part shank member, a hook member rigid with one of said parts, and an actuating member having resilient lost motion connection between said parts of the member.

10. In a car unloader, a top holder comprising a shank member, a hook member rigid therewith, a rack bar actuating member provided with lugs to extend through openings in said shank member, and cushioning means between said lugs and said shank.

11. In a car unloader, a top holder comprising a shank member, a hook member rigid therewith, a rack bar actuating member resiliently movable relatively to said shank member, a motor for actuating said rack bar, and motor circuit controlling means on said shank and said rack bar operative through relative movement of said parts.

12. A car unloader comprising a rocking car supporting frame having a side truss and having a car track, with means to hold a car on the track, a side car supporting platform exterior to and carried by and having parts movable through the truss and having bearers for engagement with the side of a car to support the car in its dumping position, and means to operate said platform.

13. A car unloader comprising a rocking car supporting frame, including a truss and having car down holding means, a car side supporting platform carried by and exterior to the truss and having extensions for movement therethrough, towards and from, and having bearers for engagement with, the side of a car to support the car in its dumping position, and means for operating said platform, carried by said frame exterior to said platform.

14. A car unloader including, in combination, a rocking car supporting frame comprising a truss, a car side supporting platform, embracing bearer members for supporting engagement with the side of a car when the frame is turned through 90° from its normal position and movable toward and from the side of the car, said platform also embracing a carrier for said bearer members supported by and exterior to said rocking frame, and platform actuating means supported by said carrier.

15. A car unloader including, in combination, a rocking car supporting frame having a truss, a car side supporting platform carried by and external to said truss and having bearer members for external supporting engagement with the side of a car when the latter is in its dumping position, said bearer members being normally in the plane of the inside of the truss and connected to the platform by extensions movable through said truss, means exterior to said truss for actuating and for locking said platform, and car down holding means cooperating with said platform.

16. A car unloader comprising a rocking car supporting frame, a car supporting platform carried by the frame for engagement with the side of a car, car down holding means cooperating with said platform and means to actuate said platform, embracing screw shafts anchored to said rocking frame, an actuating frame for said platform, and nuts swiveled to said actuating frame and threaded to said screw shafts.

17. A car unloader comprising a rocking car supporting frame, a motor geared to said frame for rocking it, a car supporting platform carried by said frame for engagement with the side of a car, and means to actuate said side platform, embracing screw shafts anchored to said rocking frame, an actuating frame for said platform, nuts swiveled to said actuating frame and a motor carried by said actuating frame and geared to said nuts.

18. A car unloader comprising a rocking car supporting frame, a motor geared to said frame for rocking it, a car supporting platform carried by said frame for engagement with the side of a car, and means to actuate said platform, embracing screw shafts anchored to said rocking frame, an actuating frame for said platform, nuts swiveled to said actuating frame and threaded to said screw shafts, parallel, laterally extending tracks on said rocking frame between which said actuating frame is supported and guided, and motor means carried by said actuating frame for said side holder.

19. In a car unloader, a trussed rocking frame, its car supporting track and a support for said frame, a side car supporting platform exterior to and having extensions movable through the trussed frame for supporting the car in its dumping position and having an extended bearing face for wide vertical and horizontal contact with the side of a car, and means exterior to the side of the trussed frame for moving said platform towards and from the side of a car when supported on said track.

20. A car unloader comprising a trussed rocking frame, its car supporting track and a support for said frame, a side car supporting platform exterior to and having parts movable through the side of the trussed frame and having an extended bearing face for contact with the side of a car, and power means carried by said platform for actuating it to move its bearing face towards and from a car supported on said track.

21. A car unloader comprising a rocking frame and its car supporting track, with means to hold the car on said track, a side car supporting platform movable through the frame toward and from, and having an extended face for supporting contact with the side of, a car, anchor members loosely connected to, and extending outwardly from, said rocking frame, a carrier frame exterior to the rocking frame and connected to said platform and anchor members, and platform actuating means asociated with said anchor members and said carrier frame to move the platform toward and from the side of a car in said rocking frame.

22. A car unloader comprising a rocking frame and its car supporting track, with means to hold the car on said track, a side car supporting platform movable through the frame toward and from, and having an extended face for supporting contact with the side of, a car, anchor members hinged to said rocking frame and extending laterally therefrom and threaded at their outer ends, and a structure extended from said platform having power driven nuts that are threaded over the threaded ends of said anchor members.

23. A car unloader comprising a rocking frame and its car supporting track, with means to hold the car on said track, a side car supporting platform movable through the frame toward and from, and having an extended face for supporting contact with the side of, a car, anchor members hinged to said rocking frame and extending laterally therefrom and threaded at their outer ends, a structure extended from said platform having power driven nuts that are threaded over the threaded ends of said anchor members, and a motor carried by said structure for driving said nuts.

24. A car unloader comprising a rocking car supporting frame having a car track, with means to hold a car on said track, a side car supporting platform exterior to the inner side of the frame having parts carried by said platform and movable through the frame for engagement with the side of a car to support the car in its dumping position and guides on and exterior to the rocking frame for guiding said platform in movement.

25. In a car unloader, a rocking car supporting frame having a car track, with means to hold a car on said track, side car supporting platforms carried by and movable through said frame and having extended bearing faces for engagement with a car on said track, an actuating structure exterior to said frame to which said platforms are attached, and power actuating means for said platform embracing cooperating parts on said rocking frame and said structure at spaced points of said structure to balance power delivered to said platforms by said actuating means and thereby maintain the supporting platforms in planes uniformly to receive the load of a car when in its dumping position.

26. In a car unloader, a rocking car supporting frame and its track, with means for holding a car on the track, car side supporting platforms movable through said frame and having parts for adjustment against the side of a car and for supporting the car in dumping position, a frame exterior to the car supporting frame connected by thrust members to the car bearing parts of said platforms, and power actuating means between the said platforms frame and said car supporting frame to move the said platforms towards and from a car in said unloader frame.

27. In a car unloader, a rocking car supporting frame and its track, with means for holding a car on the track, car side supporting platforms movable through said frame for adjustment against the side of a car and for supporting the car in dumping position, said platform including also a rectangular frame exterior to the car supporting frame connected at its corners by thrust members to the car bearing parts of said platforms, and platform actuating means, constructed also to constitute locking means to hold the platforms in supporting positions.

28. A car unloader comprising a rocking car supporting frame having a car support, with means to hold the car on said support, a side car supporting platform carried by and having parts movable through said frame for supporting the side of a car when the latter is in its dumping position, curved supporting treads fixed to the ends of said rocking frame, and means between said supporting treads to connect power to said frame to rock it.

29. A car unloader comprising a rocking car supporting frame having a car support, with means to hold the car on said support, a side car supporting platform carried by and having parts movable through said frame for supporting the side of a car when the latter is in its dumping position, curved supporting treads fixed to the ends of said rocking frame, rollers at the ends of said frame on which said treads rest and roll, and power means between said treads and connected to said frame intermediate its ends to rock said frame.

30. A car unloader comprising a rocking car supporting frame having a car support, with means to hold the car on said support, a side car supporting platform carried by and having parts movable through said frame for supporting the side of a car when the latter is in its dumping position, curved supporting treads fixed to the ends of said rocking frame, a curved rack fixed to said frame between said supporting treads and disposed in a plane generally parallel to the planes of said treads, and a power actuated pinion meshing with said rack.

31. A car unloader comprising a rocking car supporting frame having a car support, with means to hold the car on said support, a side car supporting platform carried by and having parts movable through said frame for supporting the side of a car when the latter is in its dumping position, operating means for said platform carried by said frame and exterior to said frame, and curved end frame supporting bearer treads fixed to the ends of said frame, said platform operating means being radially within the bearing surfaces of said treads.

32. A car unloader comprising a rocking frame, with means to lock and support a car in dumping position in said frame, treads fixed to the ends of said frame, equalizing rollers on which said treads rest and roll, and means centrally between said treads to apply power to said frame to rock the frame and a car locked and supported therein.

33. A car unloader comprising a rocking frame, with means to support and lock a car in dumping position in said frame, treads fixed to the ends of said frame, and roller supports for said treads comprising a pair of opposite roller frames at each end of the rocking frame hinged to a fixed support, and rollers mounted in said frames to engage said treads and to thereby support said rocking frame, as in a cradle.

34. A car unloader comprising a rocking frame, with means to support and lock a car in dumping position in said frame, treads fixed to the ends of said frame, and roller supports for said treads comprising a pair of opposite roller frames at each end of the rocking frame hinged to a fixed support, rollers mounted in said frames to engage said treads and to thereby support said rocking frame, as in a cradle, and power means between said treads for applying power to said frame to rock it.

35. A car unloader comprising a rocking frame, with means to lock and support a car therein, treads fixed to the ends of said frame, and supports on which said treads rest and roll, the engaging faces of one tread and its support being interlocked to avoid relative crosswise displacement of the tread and support, and the other tread and associated support being free for relative transverse movement.

36. A car unloader comprising a rocking frame, with means to lock and support a car therein, treads fixed to the ends of said frame, wheels on which said treads roll, the wheels of one of said treads and said tread being relatively flanged to interlock against relative transverse displacement thereof, and the other wheel and tread being smooth at their engaging faces.

37. A car unloader comprising a rocking frame, an adjustable car side supporting platform exterior to and having parts adapted to extend through one side of the frame to support the car in its dumping position, with means to operate it, and a counterweight and embodied in at the other side of the frame tending to counterbalance said platform and its operating means.

38. A car unloader comprising a rocking frame, with means to lock and support a car therein, curved trussed tread girders fixed to the ends of the frame, sectional tread members separately fixed to said girders, and supports on which the tread sections rest and roll.

39. A car unloader comprising a rocking frame, with means to lock and support a car therein, curved treads fixed to the ends of said frame at one side thereof, and means to cause said frame to rock on said treads to turn the frame and car 90° from the normal position of the rocking frame to dump the car, the weight and balance of the frame being such that the center of gravity of the rocking mass is high when the car is loaded and is lowered when the contents of the car is discharged, thereby rendering the movements of the frame partially automatic through the action of gravity.

40. A car unloader comprising a rocking frame, having curved rocking supporting bearers and having a car supporting track, means to lock a car on said track and to support in its dumping position, and means adapted to engage said frame to arrest it in normal car receiving position, and to align the rails of the frame track with rails of the outside track.

41. A car unloader comprising a rocking frame, having curved exterior supporting bearers and having a car supporting track, means to lock a car on said track and to support in its dumping position, and resilient stops to arrest the frame at both limts of its movement, one stop operating at the return movement of the frame to align the rocking frame track rails with the rails of the outside tracks.

In testimony whereof I claim the foregoing as my invention, I hereunto append my signature at Chicago, Illinois, this 15th day of January, 1920.

CHARLES L. KELLER.